United States Patent

Miyatake et al.

[11] Patent Number: 5,825,577
[45] Date of Patent: Oct. 20, 1998

[54] MAGNETIC DISK DEVICE FOR DETECTING A FLOATING STATE OF A MAGNETIC HEAD

[75] Inventors: Masami Miyatake, Naka-gun; Nobuyuki Okamoto, Odawara; Susumu Ebihara, Chigasaki, all of Japan

[73] Assignee: Hitachi, Ltd., Tokyo, Japan

[21] Appl. No.: 778,125

[22] Filed: Jan. 2, 1997

Related U.S. Application Data

[63] Continuation of Ser. No. 286,180, Aug. 5, 1994, abandoned.

[30] Foreign Application Priority Data

Aug. 18, 1993 [JP] Japan ................................. 5-204143

[51] Int. Cl.⁶ ....................................................... G11B 5/60
[52] U.S. Cl. .................................. 360/75; 360/66; 360/69
[58] Field of Search ............................... 360/75, 103, 69, 360/65, 66, 46

[56] References Cited

U.S. PATENT DOCUMENTS

| | | | |
|---|---|---|---|
| 4,777,544 | 10/1988 | Brown et al. | 360/75 |
| 4,794,464 | 12/1988 | Kaido et al. | 360/65 |
| 4,821,125 | 4/1989 | Christensen et al. | 360/46 |
| 4,841,389 | 6/1989 | Hoyt et al. | 360/103 |
| 4,931,887 | 6/1990 | Hegde et al. | 360/75 |
| 5,130,866 | 7/1992 | Klaassen et al. | 360/75 |
| 5,168,413 | 12/1992 | Coker et al. | 360/75 |
| 5,377,058 | 12/1994 | Good et al. | 360/75 |
| 5,410,439 | 4/1995 | Egbert et al. | 360/75 |

OTHER PUBLICATIONS

Gaudet et al., "Head Flight Height Monibouring", IBM Technical Disclosure Bulletin, vol. 11, No. 12, pp. 1650, May 1969.

*Primary Examiner*—Aristotelis M. Psitos
*Assistant Examiner*—Larry T. Cullen
*Attorney, Agent, or Firm*—Kenyon & Kenyon

[57] ABSTRACT

Gain information in a read amplifier, which is recorded when data to be measured is reproduced, is stored in an AGC control memory circuit in advance. By reproducing the data using the gain information, reproduced data varied according to the amount of flotation of a magnetic head and the position of the magnetic head alone can be obtained. A variation in voltage amplitude of the reproduced data is detected by an envelope signal generating circuit and a variation in phase difference between a reading cycle in which the reproduced data is read and a reference cycle is detected by a phase difference signal generating circuit. A calculator calculates a float interval of the magnetic head and a variation in the position thereof based on these detected variations. As a result, a decision can be made as to whether the float interval of the magnetic head and the variation in the position thereof exceed an allowable range. When it is judged that they have exceeded the allowable range, a warning is issued to a user so that the magnetic head and a magnetic disk can be prevented from breakage in advance.

18 Claims, 7 Drawing Sheets

MAGNETIC DISK DEVICE FOR DETECTING A FLOATING STATE OF A MAGNETIC HEAD

This application is a continuation of application Ser. No. 08/286,180, filed 5 Aug. 1994, now abandoned.

BACKGROUND OF THE INVENTION

1. Field of the Invention

The present invention relates to a magnetic disk device, and particularly to a magnetic disk device capable of detecting a variation in a floating state of a magnetic head with sufficient accuracy so as to prevent data from being destroyed due to irregularities in flotation of the magnetic head.

2. Description of the Related Art

A magnetic disk device is activated in such a manner that data is recorded on and reproduced from a magnetic disk by a magnetic head while the magnetic head floats over the magnetic disk on a micron basis under an air viscous flow due to the high speed rotation of the magnetic disk. Therefore, when the amount of flotation of the magnetic head decreases, the magnetic head comes into collision with the magnetic disk and hence tends to break the magnetic disk. Thus, the magnetic disk device has been required to hold an interval between the magnetic disk and the magnetic head with high accuracy.

Various methods have heretofore been proposed which detect the amount of flotation of a magnetic head within a magnetic disk device and a magnetic disk subsystem. First, Japanese Patent Application Laid-Open Publication No. 63-46617 (U.S. application Ser. No. 897,180 filed Aug. 15, 1986 now U.S. Pat. No. 4,777,544) describes the following method.

A recording signal having a predetermined period or cycle is written into a specific region on a magnetic disk in advance. A signal produced by reading the recording signal with a magnetic head in a floating state of the magnetic head is compared to a signal produced by reading the recording signal with the magnetic head in a low floating state (float interval=0) of the magnetic head. The ratio of amplitude of the former signal to that of the latter signal is determined. A variation in the float interval of the magnetic head at a predetermined track position and the absolute value of the float interval are calculated from the determined ratio. The method described in the above disclosure is used to detect an interval between a magnetic head core provided behind the magnetic head and the magnetic disk.

Second Japanese Patent Application Laid-Open Publication No. 1-217721 (U.S. application Ser. No. 1,437,998 filed Jan. 14, 1988) describes another method of detecting the amount of floatation of a magnetic head. A history of improper operations of a magnetic head can be detected without positioning the magnetic head at a specific data track while a system records and retrieves data, unlike Japanese Patent Application No. 63-46617. Specifically, predetermined regions in which a rewriting process is not performed under the normal operation of the system are provided on tracks on the magnetic disk and data are written into these predetermined regions in advance. While the system records and retrieves the data, the amplitudes of the data read from the predetermined regions in the tracks are compared. When the amplitude ratio between the amplitudes thereof exceeds a predetermined level, it is judged that an improper condition has occurred in the system. This technique is one of a type wherein the amplitudes of the data read from the predetermined regions in the tracks are compared and the improper condition can be detected when the amplitude ratio has exceeded the predetermined level. In the prior art in particular, however, the improper condition developed between the magnetic head and disk can be detected based on a variation in amplitude of a read signal, which occurs because the residual magnetization on the surface of a recording medium, which corresponds to recorded data, is reduced by an external stress developed by the collision between the magnetic head and disk and/or by the removal of a part of a magnetic material on the surface of the recording medium.

The aforementioned prior art, however both have the disadvantage that a head crash and head sliding movements due to a variation in a float position or attitude of the entire magnetic head cannot be detected in advance. Even where the interval between the magnetic head core for detecting a magnetic force and the magnetic disk is of a predetermined amount of flotation, the possibility of producing both a head crash and head sliding movements of the magnetic head is greatly increased when the float position of the entire magnetic head varies. When the floating or rising position or attitude of the magnetic head varies, however, nothing in the prior art can detect an inclination of a slider surface (air bearing surface) of the magnetic head.

Both Japanese Patent Application Laid-Open Publication Nos. 4-229471 (U.S. application Ser. No. 554,049, U.S. Pat. No. 5,130,866 filed Jul. 17, 1990) and 5-81807 (U.S. application Ser. No. 621,010, U.S. Pat. No. 5,168,413 filed Nov. 30, 1990 have the disadvantage that a head crash and head sliding movements due to a variation in a float position or attitude of the entire magnetic head cannot be detected in advance.

SUMMARY OF THE INVENTION

The present invention removes the possibility of a head crash and sliding movements of a magnetic head because a variation in a float position of the entire magnetic head cannot be detected in advance. In the present invention, a magnetic disk device is capable of detecting an improper condition of flotation of a magnetic head inclusive of a variation in a float position of the magnetic head and thereby prevents the magnetic head and the magnetic disk from breakage in advance.

The present invention also provides a magnetic disk subsystem which is capable of detecting an improper condition of flotation of a magnetic head including a variation in a float position of the magnetic head to thereby prevent the magnetic head and the magnetic disk from breakage in advance. The magnetic disk subsystem has an avoiding means capable of storing data recorded in a magnetic disk device in which the floating state of the magnetic head is varied, so as to avoid an impossibility of reading the data.

A magnetic disk device according to the present invention has a magnetic head for magnetically recording data on and reproducing the same from a magnetic disk for holding the data while causing the magnetic head to float over the magnetic disk. The magnetic disk device comprises at least one magnetic disk with measuring data stored thereon having a predetermined cycle, an amplifier for amplifying the measuring data detected by the magnetic head, a storing means for storing gain information of the amplifier therein, a phase difference detecting means for detecting a variation in phase difference between a reading cycle in which the measuring data reproduced using the gain information stored in the storing means is read and a reference cycle, and a calculating means for calculating a variation in the position of the magnetic head using the variation in phase difference detected by the phase difference detecting means.

Further, a magnetic disk device according to the present invention includes a magnetic head for magnetically recording data on and reproducing the same from a magnetic disk for holding the data while causing the magnetic head to float over the magnetic disk. The magnetic disk device comprises at least one magnetic disk with measuring data stored thereon having a predetermined cycle, an amplifier for reproducing the measuring data detected by the magnetic head, a storing means for storing gain information of the amplifier therein, a voltage amplitude detecting means for detecting a variation in voltage amplitude of the measuring data reproduced using the gain information stored in the storing means, a phase difference detecting means for detecting a variation in phase difference between a reading cycle to read the reproduced data and a reference cycle, and a calculating means for calculating a float interval of the magnetic head and a variation in position of the magnetic head using the variations in the voltage amplitude and phase difference both detected by the voltage amplitude detecting means and the phase difference detecting means.

The phase difference detecting means of the magnetic disk device according to the present invention sets a cycle in which read data at the time that data to be measured or measuring data is reproduced under gain control of a read amplifier is read, as a reference cycle and compares the reference cycle with a cycle in which data reproduced using the gain information stored in the storing means is read to thereby detect a variation in float position of the magnetic head based on the result of comparison. Further, the voltage amplitude detecting means effects full wave rectification on a signal read by the magnetic head and detects a decrease and an increase in the amount of flotation of the magnetic head based on an increase and a decrease in an envelope signal corresponding to an envelope of the signal subjected to the full wave rectification.

A magnetic disk subsystem includes a plurality of magnetic disk devices to each of which the present invention is applied and a magnetic disk controller for controlling the magnetic disk devices. Each of the plurality of magnetic disk devices comprises a magnetic disk with measuring data recorded thereon having a predetermined cycle, a storing means for reproducing the data under gain control of an amplifier (based on an amplification-degree control signal thereof) and storing therein gain information employed upon reproducing the read data, a voltage amplitude detecting means for reproducing the measuring data using the gain information stored in the storing means and detecting a variation in voltage amplitude of the reproduced data, a phase difference detecting means for detecting a variation in phase difference between a reproduced-data reading cycle and a reference cycle, and a calculating means for calculating a float interval of the magnetic head and a variation in float position thereof using the variation in voltage amplitude detected by the voltage amplitude detecting means and the variation in phase difference detected by the phase difference detecting means. The magnetic disk controller sets at least one of the plurality of magnetic disk devices as a spare magnetic disk device. When the calculating means employed in other magnetic disk device detects a variation exceeding an amount or level allowable for a float interval of the magnetic head and/or a float position thereof, the magnetic disk controller transfers data stored in the corresponding magnetic disk device detecting the above variation to the spare magnetic disk device so as to continuously perform processes.

The magnetic disk device according to the present invention can obtain reproduced data varied according to the float position of the magnetic head or the amount of flotation thereof alone by previously storing the gain information of the amplifier, which employed when the measuring data is reproduced, in the storing means in advance and reproducing the data, using the gain information stored in the storing means. Further, the magnetic disk device detect the variation in phase difference between the reading cycle in which the reproduced data is read and the reference cycle and the variation in voltage amplitude of the reproduced data. The calculating means calculates the variation in the position of the magnetic head or the float interval of the magnetic head using the detected variations. Thus, if a warning or the like is issued to a user where the variation in the float position of the magnetic head and the float interval thereof exceed an allowable range, then the magnetic disk device according to the present invention can prevent the magnetic head and the magnetic disk from breakage in advance.

In the magnetic disk subsystem having the magnetic disk devices to each of which the present invention is applied, when the variations in the float position and float interval of the magnetic head in each of the magnetic disk devices forming the magnetic disk subsystem exceed the allowable range, the magnetic disk controller in the magnetic disk subsystem transfers the data in the magnetic disk device in which the variations exceeding the allowable range have been detected by the calculating means, to the spare magnetic disk device so as to continuously perform the processes. It is thus possible to store the data recorded in the magnetic disk device in which the floating state of the magnetic head is varied and to avoid an impossibility of reading the data.

The above and other objects, features and advantages of the present invention will become apparent from the following description and the appended claims, taken in conjunction with the accompanying drawings in which preferred embodiments of the present invention are shown by way of illustrative example.

DETAILED DESCRIPTION OF THE INVENTION

The principle of the present invention applied to a magnetic disk device will be described below. FIG. 1 is a view for explaining a variation in a float position or attitude of a magnetic head which is in a floating state. FIG. 2 is a view for describing a variation in a read signal, which takes place according to a variation in the quantity or amount of flotation of the magnetic head. FIG. 3 is a view for describing a variation in the phase of a read signal, which takes place according to the variation in the float position of the magnetic head.

Figure 1A:
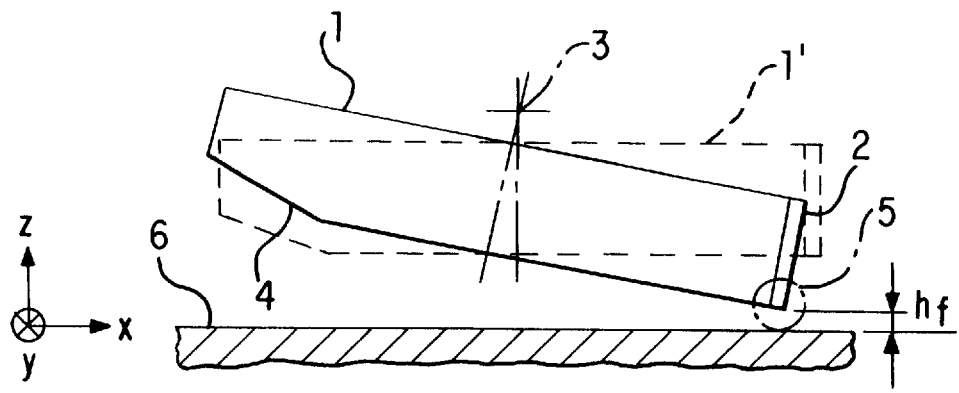
FIGS. 1(a) to (c) are views for describing a variation in a float position of a magnetic head.

Referring first to FIG. 1(a), a magnetic head 1 indicated by a solid line shows a normally floating state and is supported by an unillustrated magnetic head support mechanism. Specifically, the magnetic head 1 is supported by the magnetic head support mechanism in such a manner that an air take-in or inflow portion 4 on a slider surface extends upward toward the direction of rotation of a magnetic disk 6 and a magnetic head core 2 is held constant at a float interval hf so as to respond to the shape or up-and-down movements of the surface of the magnetic disk 6. The magnetic head 1 relative to tracks on the magnetic disk 6 for recording and reproducing data is designed so as to be supported and loaded softly with respect to a linear movement in a z direction as seen in FIG. 1 and rotational movements about an x-axis and a y-axis and to be highly rigid with respect to the directions other than the z direction. In this case, the magnetic head 1 has centers of rotation relative to the x and y axes in terms of the rotational movements. A point 3 in the drawing shows the center of rotation about the y axis.

On the other hand, a magnetic head 1' indicated by a broken line shows a state of a variation in the floating state. The floating state of the magnetic head 1' represents an unstable state in which the slider surface of the magnetic head, which is opposed to the magnetic disk 6 is substantially parallel to the surface of the magnetic disk 6 and the point 3 is set as the center of rotation. Thus, the magnetic head includes motional components such as the linear movement in the z direction and the rotational movements about the x and y axes with respect to the variation in the floating state. By separately considering such movements, variations in the float interval and position can be measured.

Figure 1B:
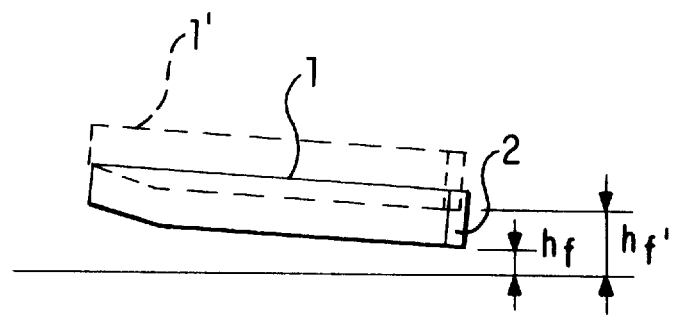
Figure 2A:
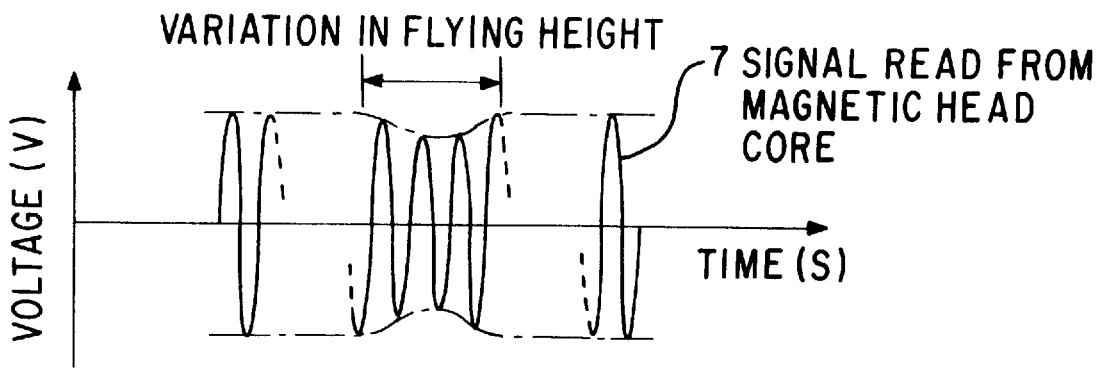
FIGS. 2(a) to (c) are views for describing a variation in an envelope signal with respect to read data, which occurs according to a variation in the amount of flotation of the magnetic head shown in FIGS. 1(a) to (c).
Figure 2B:
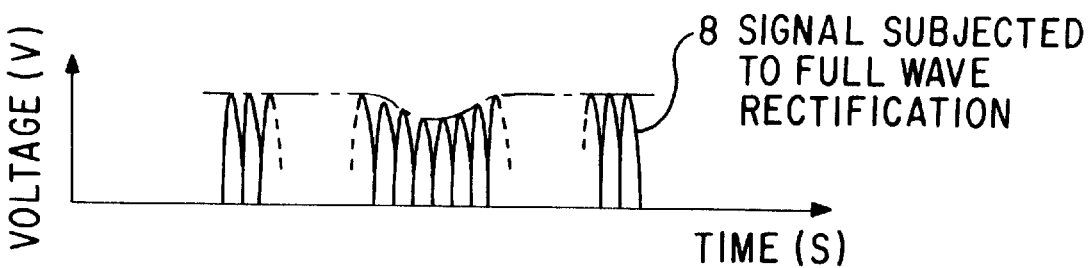
Figure 2C:
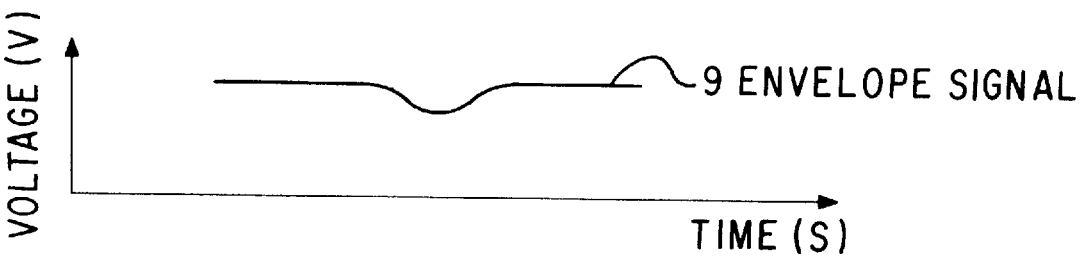
Figure 3A:
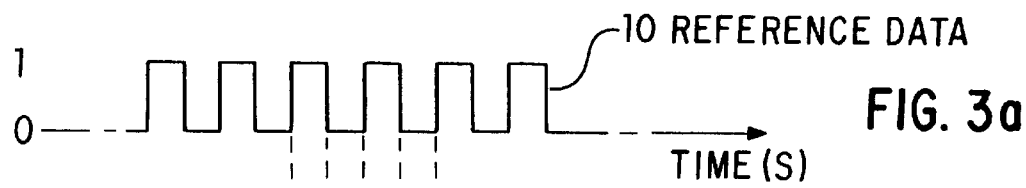
FIGS. 3(a) to (c) are views for describing a variation in the phase of read data, which takes place according to the variation in the float position of the magnetic head shown in FIGS. 1(a) to (c).
Figure 3B:
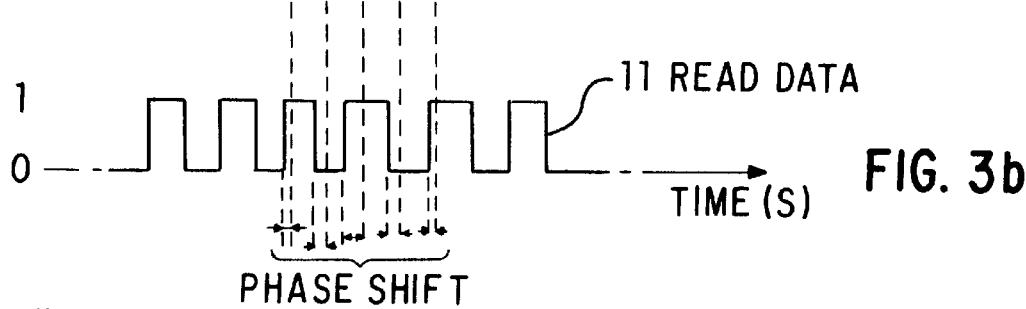
Figure 3C:
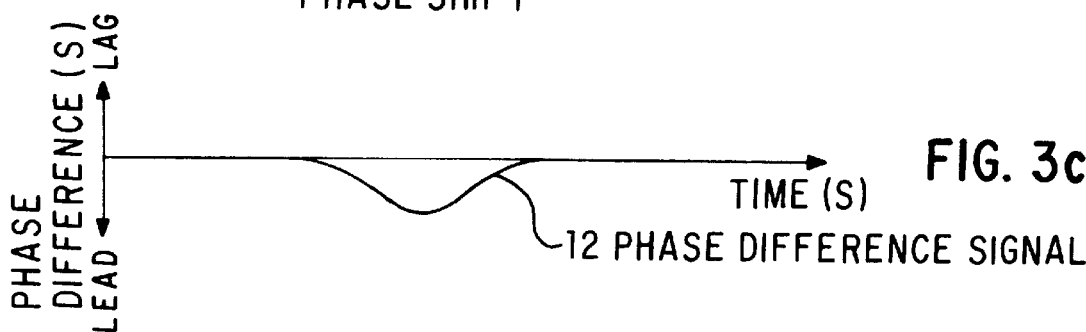

FIG. 1(b) and FIG. 2(a) illustrate a state in which a float height of the magnetic head is being changed. FIG. 1(b) shows the case where the magnetic head 1 is floated to the height of a magnetic head 1' indicated by a broken line from the normal condition and the amount or quantity of flotation of the magnetic head core 2 increases from hf to hf'. FIG. 2(a) shows a read signal 7 obtained when the amount of flotation of the magnetic head 1 is varied. Signal 7 is read from the magnetic head core 2 when data having a predetermined period, which has been recorded on a predetermined track on the magnetic disk 6 in advance, is read. Because the magnetic disk 6 is spaced away from the magnetic head 1 when the amount of flotation increases, the magnitude of amplitude of the read signal 7 is reduced. A signal 8 obtained by effecting a full wave rectification process on the read signal 7 is shown in FIG. 2(b). An envelope signal 9 obtained by removing the envelope of the rectified signal 8 is illustrated in FIG. 2(c). In FIG. 2(c), a portion of signal 9 corresponding to an increase in the amount of flotation is shaped in the form of a concavity.

Thus, an increase in the amount of flotation of the magnetic head core 2 of the magnetic head 1 can be judged based on a level reduction in the envelope signal 9. On the other hand, a decrease in the amount of flotation of the magnetic head core 2 can be determined or judged based on an increase in a signal outputted according to the approach of the magnetic head core 2 to the magnetic disk 6. The present invention makes use of the principle of detecting up-and-down displacements or variations in the magnetic head core 2 based on the increase and decrease in the envelope signal 9.

The relationship between the rate of change x[%] in voltage amplitude of the read signal and a displacement or variation Δhf (hf–hf') [m] in the float height of the magnetic head 1 at the position where the magnetic head core 2 exists, can be given by the following equation based on the principle of magnetic record/reproduction separation loss:

$$\Delta hf = 0.336 \lambda \log (1+x/100) \tag{1}$$

where λ is the recording wavelength [m], x is the rate of change 1 n read voltage [%] and the sign of Δhf is represented with an hf decreasing direction as +.

Assuming now that the radius of a track with data stored thereon is represented as R[mm], the recording frequency is represented as f[Hz] and the number of revolutions of a disk is represented as N[r/min], λ[μm] can be expressed as follows:

$$\lambda = 100 \, \pi \, NR/3f \tag{2}$$

where π is the ratio of the circumference of a circle to its diameter.

Therefore, the variation in the float height of the magnetic head at the magnetic head core position can be calculated based on the rate of change in the voltage amplitude of the read signal 7 using the equations (1) and (2).

Figure 1C:
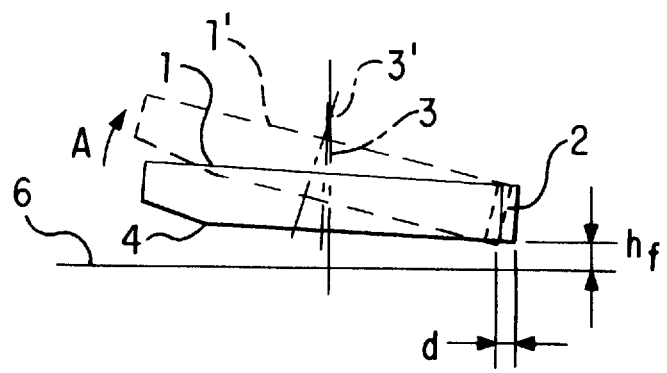

On the other hand, FIG. 1(c) shows a state in which a magnetic head 1 indicated by a solid line has been set up in such a manner that an air inflow port 4 at a leading end portion of a slider surface is rotated in the direction indicated by arrow A without changing a float interval hf of a magnetic head core 2, i.e., the state in which the magnetic head 1 has been rotated to the position of a magnetic head 1' indicated by a broken line. Because, in this case, the magnetic head 1 is rotated in the direction indicated by arrow A along points 3 and 3' which are not displaced in the x-axis direction, the magnetic head core 2 is moved so as to include a component d displaced in the x-axis direction or a track recording direction.

When data written on a track is reproduced using the magnetic head 1' whose position or attitude has been varied by rotation, the magnetic head 1 is displaced at a constant speed relative to the magnetic disk 6. Therefore, when the position or attitude of the magnetic head 1 is changed to that of the magnetic head 1' in the above-described manner, the change in the position thereof is represented as a time delay or lag in reading the data. As a result, the frequency of the read signal changes from the reference frequency at the time that the data was written onto the track. As shown in FIG. 3, read data 11, the read signal waveform-processed into a digital form, is phase-shifted with respect to predetermined reference data 10. The phase shift can be detected by a phase difference signal detecting circuit as a difference in phase between the read signal period or cycle and the reference period or cycle.

Assuming now that the radius of the track on which the data has been written is represented as R[mm] and the number of revolutions of the disk is represented as N[r/min] when the phase shift between the read data and the reference data is represented as ΔT[s], a displacement d[μm] in the track recording direction of the magnetic head core of the magnetic head can be given by the following equation (3):

$$d = 100 \, \pi \, NR \Delta T/3 \tag{3}$$

Namely, the positional displacement in the track recording direction, of the magnetic head core of the magnetic head can be calculated from the radius R of the track on which the data has been measured, the number of revolutions N of the disk and the detected phase shift ΔT using the equation (3). Incidentally, an actual displacement in the track recording direction is introduced in accordance with equations 4 through 6 to be described below.

The variation in the float position of the magnetic head is normally considered to be a rotational movement in which a supporting point is set as the center. The supporting point is where the slider of the magnetic head is supported and for fixed by a support spring for applying a load used to determine the amount of flotation of the magnetic head and for fixing a plane position on the disk surface. Therefore, the relationship between the positional displacement of the magnetic head core in the track recording direction, which is developed according to the rotational movement at the time of the variation in the float position, and the variation in the float position 20 of the magnetic head is univocally determined from the geometrical positional relationship between the supporting point and the magnetic head core. Accordingly, the variation in the float position of the magnetic head can be calculated from the calculated displacement d. In the present invention, float improper conditions of the magnetic head, which include a variation in the float position of the magnetic head, can be detected using the above principle. It is also possible to previously prevent the magnetic head and the magnetic disk from breakage.

Incidentally, the case where the magnetic head core 2 of the magnetic head 1 is mounted to an air outflow end 5 of the magnetic head 1 will be described. However, the mounting position of the magnetic head core is not necessarily limited to or by the above position. As the following description will show the present invention can be achieved even if the magnetic head core is mounted to any position of the magnetic head so long as a data writing and reading process can be executed in terms of magnetic recording.

A magnetic disk device according to one embodiment of the present invention using the above principle will hereinafter be described in detail with reference to the accompanying drawings.

Figure 4:
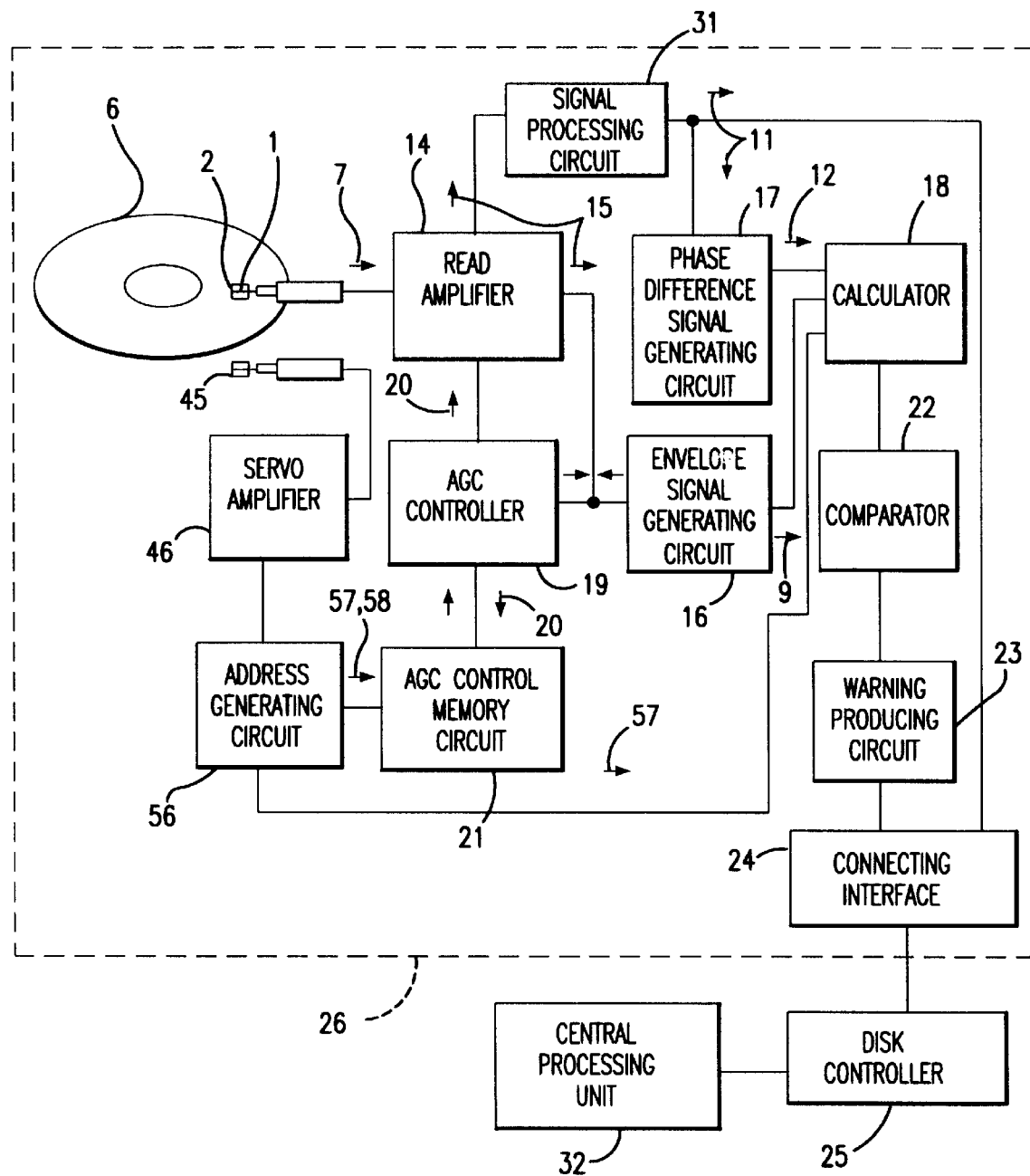
FIG. 4 is a view showing the overall structure of a magnetic disk device according to one embodiment of the present invention.

FIG. 4 is a circuit block diagram schematically illustrating the overall structure of the magnetic disk device according to the present embodiment. The magnetic disk device according to the one embodiment of the present invention has a construction which will be described later. The magnetic disk device has, as a signal generating unit, a read amplifier 14 for amplifying signal 7. Signal 7 is reproduced from an unillustrated track on a magnetic disk 6 using a magnetic head core 2 of a magnetic head 1 up to a voltage suitable for signal processing and outputting a read signal 15 therefrom. No problem arises in the present invention even for a plurality of magnetic disks 6 and a plurality of magnetic heads 1, although not illustrated in FIG. 4. An amplification factor or degree of the read amplifier 14 is automatically gain-controlled to hold the voltage amplitude of the read signal 15 constant. An AGC (Automatic Gain Control) controller 19 sends an amplification-degree control signal 20 corresponding to automatic gain information to the read amplifier 14 so as to control the read amplifier 14. A AGC control memory circuit 21 stores an amplification degree corresponding to the position of the magnetic head 1 on the magnetic disk 6 therein. An envelope signal generating circuit 16 detects a variation in the voltage amplitude of the read signal 15 amplified by the read amplifier 14 and sends an envelope signal 9 to a calculator 18. A signal processing circuit 31 electrically processes the read signal 15 into digital form and converts the digitized signal into read data 11. A phase difference signal generating circuit 17 detects a variation in the phase shift between the read data 11 obtained from the signal processing circuit 31 and reference data and outputs a phase difference signal 12 therefrom. A servo amplifier 46 reads a servo signal recorded on a predetermined sector of the magnetic disk 6 or other servo disk using a servo head 15 and amplifies the read servo signal. An address generating circuit 56 generates a cylinder position signal 57 and a sector position signal 58 corresponding to addresses indicative of the position of the magnetic head in response to the servo signal supplied from the servo amplifier 46. The calculator 18 receives the envelope signal 9, the phase difference signal 12 and the cylinder position signal 57 therein as inputs, and calculates and outputs variations in a float interval and position of the magnetic head 1 on a desired track. A comparator 22 compares the values of the variations calculated by the calculator 18 with a pre-set allowable value in relation to the floating state in which a data reading process is disabled. When the comparator 22 determines that the calculated values of variations have exceeded the allowable value, a warning producing circuit 23 generates a warning signal to a host or high order device. A connecting interface 24 transfers the warning signal produced by the warning producing circuit 23 to a disk controller 25 and a central processing unit 32 each corresponding to the host device.

A detailed construction of an AGC functional unit including the address generating circuit 56 and the AGC control memory circuit 21 will be described later.

Figure 5:
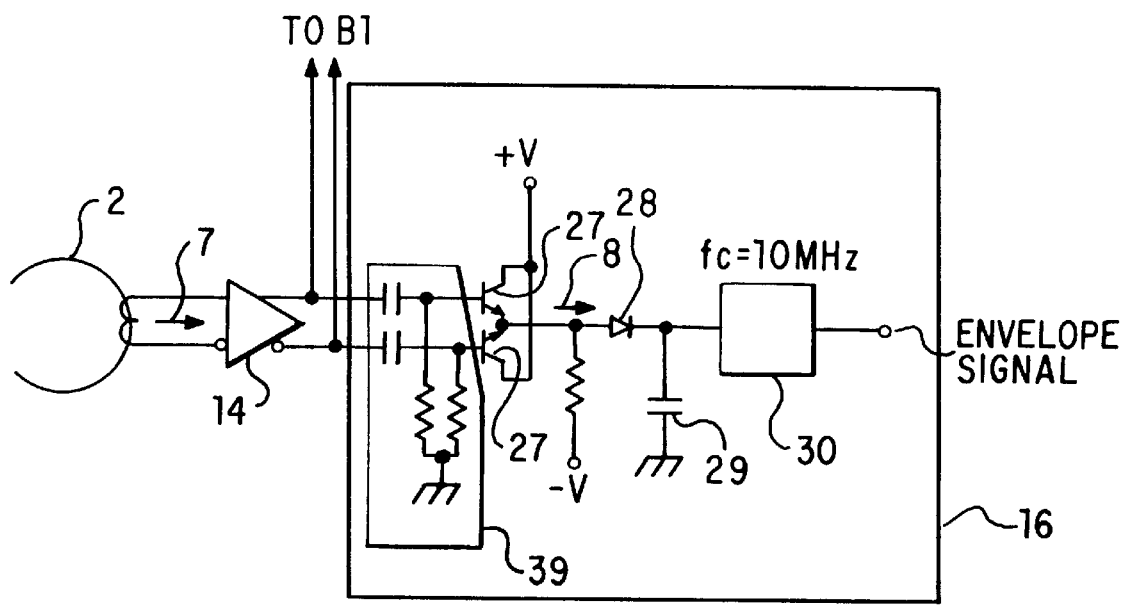
FIG. 5 is a view illustrating, in detail, the structure of an envelope signal generating circuit shown in FIG. 4.

FIG. 5 illustrates the envelope signal generating circuit 16. The envelope signal generating circuit 16 includes the read amplifier 14 for amplifying the signal 7 read by the magnetic head core 2 of the magnetic head 1, a transistor 27 for effecting the full wave rectification process on the amplified signal to thereby produce the rectified signal 8 shown in FIG. 2(b), a diode 28 and a capacitor 29 for effecting an envelope process on the signal 8 so as to produce an envelope signal, and a filter 30 for removing a noise component of 10 MHz or lower from the enveloped signal and outputting an envelope signal 9 therefrom.

Figure 6:
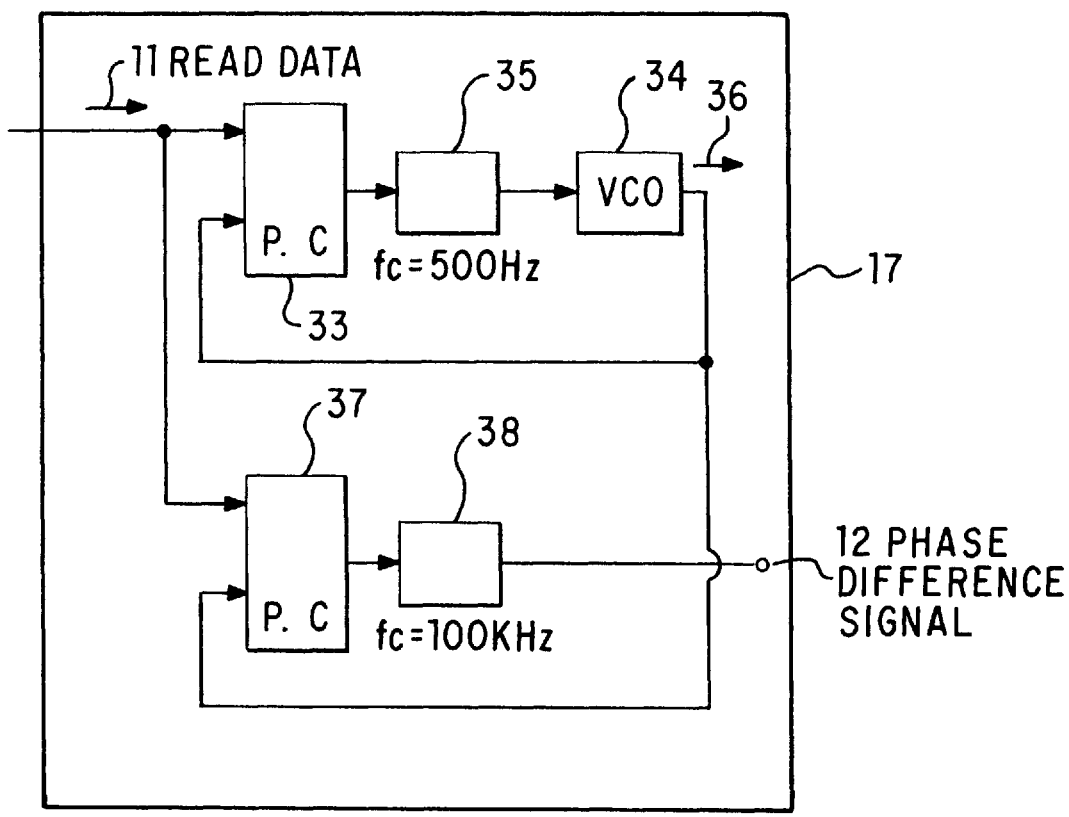
FIG. 6 is a view depicting, in detail, the structure of a phase difference signal generating circuit shown in FIG. 4.

FIG. 6 shows the phase difference signal generating circuit 17. When the magnetic head 1 gives rise to a variation in its float position, the phase of the read data 11 produced from the signal processing circuit 31 varies depending on the operation of the magnetic head 1. A frequency range of the phase variation substantially corresponds to an oscillation frequency of the magnetic head 1. In the present embodiment, the oscillation frequency of the magnetic head 1 is set to a frequency range from about 1 kHz to 20 kHz. The phase difference signal generating circuit 17 employed in the present embodiment detects frequency components of the signal obtained as the read data 11 from the signal processing circuit 31.

The phase difference signal generating circuit 17 has a first phase comparator ("PC") 33 for receiving the read data 11 digitized by the signal processing circuit 31. The output of the PC 33 is input to a voltage-controlled oscillator ("VCO") 34 through a 500 Hz filter 35. The output of the VCO 34 is looped to the PC 33 to remove noise produced by any variation in the rotation or speed of a motor. The output produced from the VCO 34 becomes a reference signal 36 synchronized with the read data 11 and in which a synchronizing frequency fc is set to 500 Hz.

A second PC 37 receives the read data 11 and the reference signal 36 synchronized with the read data 11 therein and produces a phase difference signal 12 through a filter 38 with fc=100 kHz. By causing the output data of the second PC 37 to pass through the filter 38, various influences such as a peak shift, noise, etc. exerted on the data can be reduced. The phase difference signal 12 effectively exhibits a phase difference component caused by the variation in the flotation of the magnetic head 1 where the data is caused to pass through the two filters.

Figure 7:
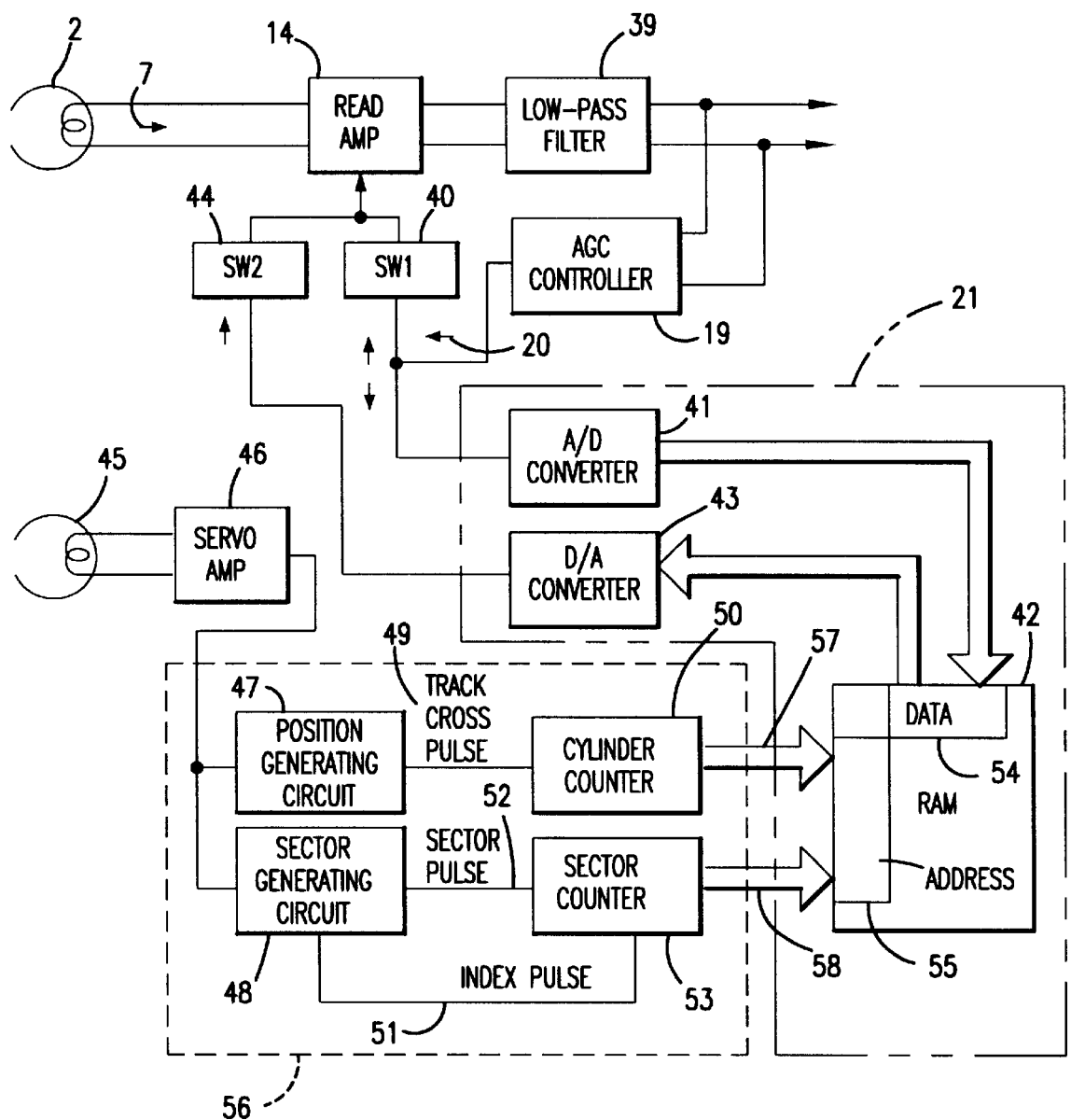
FIG. 7 is a view for describing an AGC controller and an address generating circuit shown in FIG. 4.

Further, as shown in FIG. 7, the AGC functional unit including the address generating circuit 56 and the AGC control memory circuit 21 has a low-pass filter 39 for removing high frequency components from a signal obtained by amplifying the signal 7 read through the magnetic head core 2 with the read amplifier 14, and an AGC controller 19 for comparing an output signal input from the low-pass filter 39 with a predetermined output value and outputting an amplification-degree control signal 20 therefrom based on the result of comparison. The AGC functional unit includes the address generating circuit 56 for receiving the servo signal read by the servo head 45 therein through the servo amplifier 46 and producing the cylinder position signal 57 therefrom based on the received servo signal. The AGC functional unit also includes AGC control memory 21 for storing the amplification degree of the read data corresponding to the position of the magnetic head 1, which is produced from the address generating circuit 56.

The address generating circuit 56 comprises a position generating circuit 47 for generating a track cross pulse 49 produced according to the scanning movement of a track, based on the servo signal input from the servo amplifier 46. The address generating circuit 56 also includes a cylinder counter 50 for counting the track cross pulse 49, a sector generating circuit 48 for generating a sector pulse 52 produced according to the sector scanning movement on the track, based on the servo signal input from the servo amplifier 46, and a sector counter 53 for counting the sector pulse 52 and for feeding back an index pulse 51 reset for each rotation of the disk based on the counted pulse 52 to the sector generating circuit 48. The address generating circuit 56 produces the cylinder position signal 57 and the sector position signal 58 indicative of the position of the head therefrom in response to the servo signal inputted from the servo amplifier 46.

The AGC control memory 21 comprises an A/D converter 41 for receiving the amplification-degree control signal 20 corresponding to the automatic gain information from the AGC controller 19, a random access memory ("RAM) 42 for receiving the amplification-degree control signal 20a digitized by the A/D converter 41 through a data input/output port 54, receiving a head position signal (the cylinder position signal 57 and the sector position signal 58) supplied from the address generating circuit 56 through an address input port 55 and outputting an amplification-degree signal therefrom based on the input head position signal and amplification-degree control signal 20, and a D/A converter 43 for converting the amplification-degree signal supplied from the RAM 42 into an analog signal and outputting the converted signal to a second analog switch 44. An analog switch 40 supplies the amplification-degree control signal 20 supplied from the AGC controller 19 to the read amplifier 14. In the description of FIG. 4, the cylinder position signal 57 corresponding to the read signal input to the calculator 18 is identical to the cylinder position signal 57 which has been described herein.

The operation of the magnetic disk device according to the present embodiment will next be described. When the magnetic disk device 26 is in an initial state, the magnetic disk device normally writes data to be measured having a predetermined frequency into parts of regions in which intrinsic information is stored on a non-rewriting data surface of disk. Next, the magnetic disk device 26 reads the measuring data under an operated state of the AGC functional unit with the analog switch 40 and the switch 44 shown in FIG. 7 respectively held ON and OFF. When the data is reproduced in this condition, the data reproduced by the magnetic head core 2 is supplied to the ON-held analog switch 40 through the read amplifier 14. Therefore, the amplification-degree control signal 20 is fed back to the read amplifier 14 through the AGC controller 19 so as to effect amplifying control based on a normal auto gain control function and correct a variation in the read signal 7, which is caused by non-uniformity or the like of a disk-medium free from influence of the variation in the floating state. As a result, the read amplifier 14 outputs a read signal 15 amplified to a predetermined voltage amplitude therefrom.

The magnetic disk device according to the present embodiment sends the amplification-degree control signal 20 digitized by the A/D converter 41 to the input/output port 54 of the RAM 42 simultaneously with the amplifying control based the auto gain control function. Thereafter, RAM 42 stores the amplification-degree control signal 20 while the amplification-degree control signal 20 is being associated with the head position signal (the cylinder position signal 57 and the sector position signal 58) based on the servo signal input through the address input port 55. Namely, the present magnetic disk device causes the RAM 42 to store therein the information amplification-degree control signal indicative of the auto gain in its initial state, which is associated with each track and sector with the cylinder and sector positions where the data for measurement have been read, as addresses.

Next, the magnetic disk device causes the RAM 42 to record the amplification-degree control signal associated with the head position where the measuring data has been read upon reproducing the data in its initial state. Thereafter, the present magnetic disk device activates the AGC functional unit upon execution of the subsequent measurement with the analog switch 40 and the switch 44 respectively held OFF and ON.

In the magnetic disk device according to the present embodiment in this case, because only the analog switch 44 is held ON, the amplification-degree control signal 20 supplied from the AGC controller 19 is not fed back to the read amplifier 14. Alternatively, the amplification-degree control signal recorded in the RAM 42 in which the cylinder and sector positions where the measuring data has been read out, are set as the addresses, is read and converted into analog form by the D/A converter 43. Thereafter, the converted analog signal is inputted to the read amplifier 14 to effect a data reproducing process.

Thus, the present magnetic disk device reads the data while correcting a variation in the head read voltage due to the non-uniformity of the surface of the magnetic disk or the head position or the like. The correction is performed by envelope signal generating circuit 16 and, for example, is based on the amplification-degree control signal stored in the RAM 42 in advance. Therefore, only a variation in the head read voltage caused by the improper condition of the flotation of the magnetic head, as described in FIG. 1, can be detected as a variation in the amplitude of an output voltage.

When, for example, the magnetic head is positionally shifted as shown in FIG. 1(b) and a reduction in the voltage amplitude as shown in FIG. 2, which takes place due to the variation in the floating state of the magnetic head, is included in the read signal 15 output from the read amplifier 14, the calculator 18 can calculate a displacement or variation in the float height of the magnetic head at that position of the magnetic head core using the equations (1) and (2) from the rate of change in the envelope signal 9 produced from the envelope signal generating circuit 16.

Similarly, when the magnetic head is positionally shifted as shown in FIG. 1(c) and the phase difference shown in FIG. 3 caused by the variation in the floating state of the magnetic head is included in the read signal 15, the phase difference signal generating circuit 17 can detect the phase difference signal 12 and the calculator 18 can calculate a position displacement in the track recording direction, of the magnetic head core of the magnetic head.

In the phase difference signal generating circuit 17 shown in FIG. 6, for outputting the phase difference signal 12 therefrom, the first PC 33 receives the read data 11 therein and feeds back the output obtained by comparing the received read data 11 with the output 36 of the VCO 34. Thereafter, the output of the first PC 33 is input to the VCO 34 through the filter 35. As a result, the output 36 of the VCO 34 is synchronized with a variation in a frequency of 500 Hz or below set to the filter 35 but is not synchronized with a variation in a frequency of more than 500 Hz. Further, the output 36 of the VCO 34 is synchronized with the read data 11. Thus, the phase difference signal generating circuit 17 is operated in the following manner. Even when the frequency of the read data 11 varies by several kHz according to the variation in the floating state of the magnetic head, the frequency of the output 36 of the VCO 34 does not vary. Next, the output 36 and the read data 11 are input in and compared by the second PC 37 and the result of comparison is caused to pass through the band fc=100 kHz of the filter 38. Thus, when the frequency of the read data 11 varies by several kHz, the phase difference signal 12 is output from the phase difference signal generating circuit 17. Namely, the phase difference signal generating circuit 17 can detect, as the phase difference signal 12, a phase difference that falls within a frequency range of (f=) 500 Hz to 100 kHz from the read data 11 due to a variation in the floating state of the magnetic head. The band of each filter is established by taking into consideration that a frequency of f=500 Hz or lower is required for synchronization to follow up a variation in the rotation of the disk and a frequency of f=100 kHz or higher is required to avoid the generation of an output corresponding to a peak shift that is developed due to a failure in a disk surface and the like.

Figure 8:
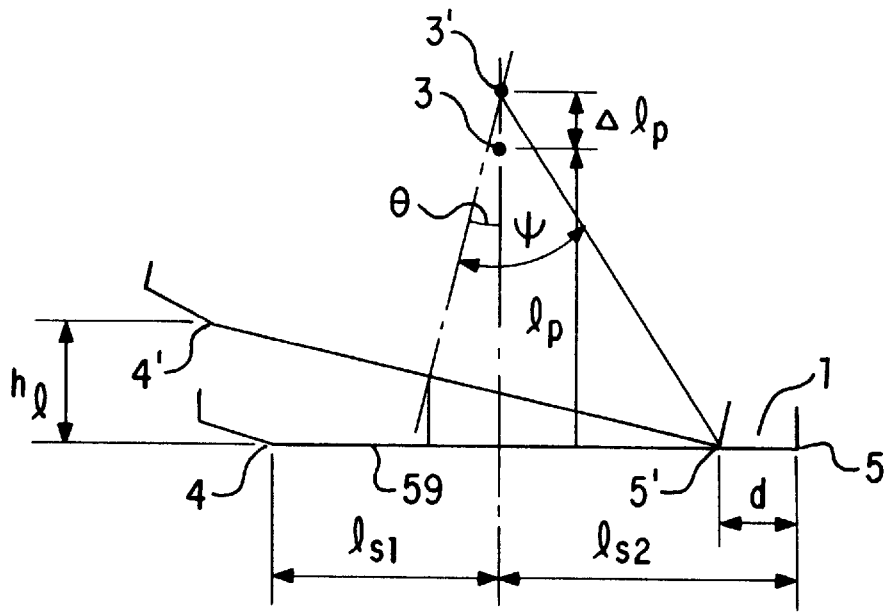
FIG. 8 is a schematic view for describing another example of the variation in the float position of the magnetic head.

Here, as shown in FIG. 8 and given by the following equations (4) through (6), the displacement d in the track direction, of the magnetic head core of the magnetic head employed in the present embodiment, which is attached to the air outflow end of the slider, is related to the displacement or variation $h_l$ in the float height of the magnetic head at the air inflow end, which shows a variation in the float position.

$$\psi = \tan^{-1} l_{s2}/l_p \quad (4)$$

$$\theta = \sin^{-1} \cdot d - l_{s2}/\sqrt{l_{s2}2 = l_p} \; 2 + \psi \quad (5)$$

$$h_l = (l_{s1} + l_{s2})\sin\theta \quad (6)$$

Symbols $l_{s1}$ and $l_{s2}$ respectively represent a distance extending in the x-axis direction from the center of rotation 3 of the magnetic head 1 to the air inflow end 4 and a distance extending in the x-axis direction from the center of rotation 3 of the magnetic head 1 to the air outflow end 5. Symbol $l_p$ represents a distance extending in the z-axis direction from an air/bearing surface 59 to the center of rotation 3 of the magnetic head 1. The x and y axes used in FIG. 8 and the equations (4) through (6) respectively show the air/bearing surface in the normal floating state of the magnetic head and the direction orthogonal to the air/bearing surface. Because, however, the inclination between the disk surface and the air/bearing surface of an actual magnetic head and the variation in the float position thereof are both slight angles, the $h_l$ shown in FIG. 8 may be considered to be the variation in the float height of the magnetic head at the air inflow end.

Thus, in the present embodiment, the equation (3) for establishing the relationship between the phase shift of the read data 11 and the displacements of the magnetic head core in the track direction and the equations (4) through (6) for establishing the relationship between the displacement of the magnetic head core in the track direction and the variation in the float height of the magnetic head at the air inflow end are stored as data in the calculator 18 shown in FIG. 4. The calculator 18 calculates and outputs the value $h_l$ the variation in the float height at the air inflow end using the above equations, based on the input phase difference signal 12 and the input cylinder position 57 where the data has been read.

The values of the variations in the float height and position of the magnetic head 1, which have been calculated in this process, are input to the comparator 22. These values of the variations are compared with the allowable value set in the comparator 22 in advance. The allowable value may preferably be set by demonstrating the state of a variation in the flotation of a magnetic head, the occurrence of erroneously reading data and the occurrence of damage to a magnetic head or a disk, or by basing them on actual data, separately from demonstrational processes executed by the device for effecting the present embodiment. In the present embodiment, two kinds of values are set as the allowable value. One of the values is represented as the amount of variation in which the rate of occurrence of data reading errors exceeds the limit allowable for the use of the device. The other value is represented as the amount of variation in the limit at which the damage to either the magnetic head or the disk starts to occur. When the calculated value indicative of the amount of variation in the float height or float position, which is obtained as a result of the measurement of the floating state of the magnetic head exceeds the allowable value, decision results of two types are outputted according to the type of the allowable value. The result of comparison by the comparator 22 is input to the warning producing circuit 23 from which two types of warning signals are transmitted to the disk controller 25 and the central processing unit 32 via the connecting interface 24 according to the type of the output produced from the comparator 22.

The disk controller 25 that has received the warning signals instructs the magnetic disk device 26 to perform the following operations according to the type of the above warning, for example.

When the warning signal is first issued on the ground that the rate of occurrence of the data reading errors exceeds the limit, the disk controller 25 sends a command or instruction for repeating a predetermined recovering seek operation for a predetermined time to the magnetic disk device 26. After completion of the recovering seek operation, the disk controller 25 re-executes the above measurement of floating state and checks whether the warning signals have been re-issued or have disappeared. The seek operation is performed by, for example, slidingly moving an air/bearing surface corresponding to a float surface of a magnetic head over a contact/stop/start zone other than a data recording region under the condition of the reduced number of revolutions of a disk so as to clean the air/bearing surface.

When the warning signals are stopped under the recovering seek operation, the disk controller 25 determines that an improper condition of flotation of the magnetic head has been recovered and resumes the normal operation based on the result of determination. On the other hand, when the warning signals are re-issued, the disk controller 25 repeatedly executes the predetermined recovering seek operation up to a predetermined number of times. When the warning signals are issued even after the predetermined seek operation has been repeatedly executed by the predetermined number of times, the disk controller 25 instructs the disk to stop rotating. After the disk has been rotated again, the disk controller 25 executes the above measurement of floating state and checks whether the warning signals are in a re-issued state or a non-issued state. When it is judged that the warning signals have disappeared, the disk controller 25 resumes the normal operation. On the other hand, when it is judged that the warning signals have been re-issued, the disk controller 25 executes a process identical to that with respect to the warning signals about the occurrence of the damage to either the magnetic head or the disk.

When it is determined that the warning signals are related to the occurrence of damage to either the magnetic head or the disk, the disk controller 25 sends a request signal related to the occurrence of a malfunction of the magnetic disk device 26 and its maintenance process to the central processing unit 32. Further, the disk controller 25 instructs the magnetic disk device 26 to stop operating and warns the user of the maintenance process such as a system call or the like.

Thus, the magnetic disk device according to the present embodiment records and reproduces the measuring data in its initial state and causes the AGC control memory circuit 21 to store the on-reproduction amplification-degree signal in association with the track/cylinder the magnetic head. In this condition, the magnetic disk device reproduces the measuring data while the amplification-degree control is performed by the read amplifier 14 using the amplification-degree signal to thereby detect the envelope signal in the read data so as to monitor the amount of variation in the float height of the magnetic head at the position of the magnetic head core and detect the phase shift of the read data so as to monitor the displacement in the track direction, of the magnetic head core. As a result, the improper condition of flotation of the magnetic head can be detected and the magnetic head and disk can be prevented from breakage in advance.

Accordingly, the magnetic disk device according to the present embodiment can measure a variation in a floating state inclusive of a variation in a float position of a magnetic head, which could not be measured by a combination of disks. Further, the magnetic disk device performs gain control on data to be measured, based on an amplification-degree signal stored under the initial state of the device, so as to correct an initially-existing variation in a head read signal, thereby making it possible to correctly measure only a variation in a floating state of the magnetic head at the time that the device has started operating. Furthermore, because the magnetic disk device regularly measures the variation in the floating state during its operation and issues a warning to a host device or an operator when the measured amount of variation exceeds a predetermined allowable level, the magnetic disk device can take preventive means or measures for maintaining data before the reading of the data falls into difficulties. Because a recovery operation including a cleaning operation of an air/bearing surface of a magnetic head is performed by the magnetic disk device that has issued the warning, a variation in a floating state of the magnetic head can be recovered to the normal state.

The present embodiment describes a process for detecting the float position or attitude of the magnetic head employed in the magnetic disk device driven as a single and for coping with the improper conditions of the magnetic head. If the present invention, however, is applied to a disk subsystem including a plurality of magnetic disk devices, then a further effectiveness can be obtained. An embodiment other than the above embodiment will hereinafter be described in detail with reference to FIG. 9.

Figure 9:
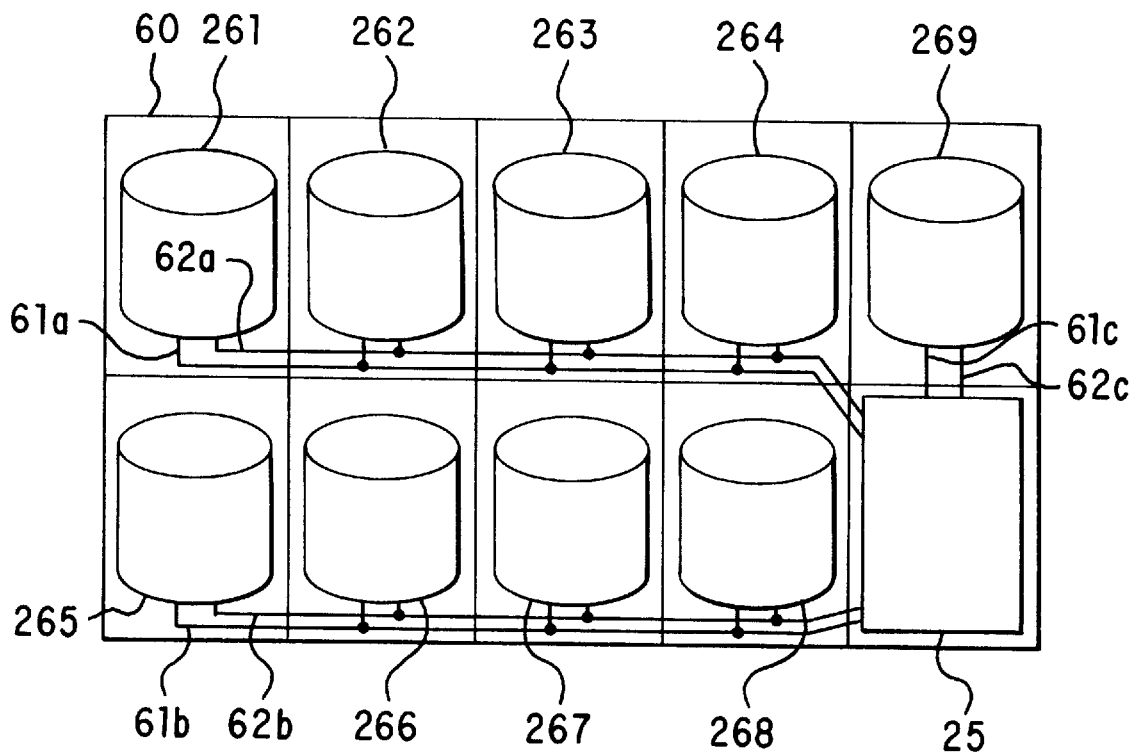
FIG. 9 is a view typically illustrating the structure of a disk subsystem according to the present invention.

FIG. 9 illustrates a disk subsystem of a type wherein nine magnetic disk devices 261 through 269 each corresponding to the magnetic disk device described in the above embodiment and one magnetic disk controller 25 for measuring the floating state of the magnetic head are integrally incorporated into a housing 60. The plurality of magnetic disk devices 261 through 269 are electrically connected to the magnetic disk controller 25 for measuring the floating state of the magnetic head through data transmission lines 61a through 61c and command/information transmission lines 62a through 62c. When a normal disk subsystem is in use, the eight magnetic disk devices 261 through 268 of the nine magnetic disk devices are normally in an operating state and the remaining magnetic disk device 269 is in a nonoperating state as a spare device.

When the magnetic disk controller 25 is in an initial state, the disk subsystem records measuring data in and reproduces the same from all the magnetic disk devices in a manner similar to the above embodiment. Further, the disk subsystem causes an AGC control memory circuit to store an on-reproduction amplification-degree signal therein so as to correspond to a track/cylinder of a magnetic head. Next, the present disk subsystem utilizes the eight magnetic disk devices 261 through 268 in the normal state and instructs these operating magnetic disk devices to measure head floating states each time a predetermined time elapses. In this condition, the disk subsystem reproduces the measuring data again in a manner similar to the above embodiment while performing the control of amplification degree by a read amplifier using the amplification-degree signal recorded upon producing the measuring data to detect an envelope signal in the read data and a phase shift thereof, thereby measuring the amount of variation in a float height of a head with respect to a magnetic head core and a displacement of the magnetic head core in a track direction. When the measurement result indicates that the calculated value indicative of the amount of variation in the float position has exceeded an allowable value, i.e., when no warning signal is issued, the disk subsystem continues to perform in the normal operating state.

When a warning signal about the rate of occurrence of data reading errors is issued upon the above measurement, the magnetic disk controller 25 instructs the corresponding magnetic disk device to perform a seek operation and a disk rotation stopping operation similar to those described in the above embodiment. When no warning signal is issued, the magnetic disk device is returned to the normal operating state. When the warning signal is issued even after execution of the recovering operation and a warning signal about the occurrence of damage to either the head or the disk is issued, the magnetic disk controller 25 activates the magnetic disk device 269 being in non-operation and then transfers all the data stored in the magnetic disk to which the warning signal is being continuously issued, to the magnetic disk device 269 which has been brought into the operating state. Thus, after the data stored in the magnetic disk device to which the warning signal is issued are transferred into the spare device, the magnetic disk device 25 requests a central processing unit (not shown) to effect a maintenance process on the magnetic disk device to which the warning signal has been issued.

The disk subsystem according to the present embodiment as described above is constructed such that the magnetic disk controller uses one of the plurality of magnetic disk devices as the spare device. Further, the disk subsystem measures the variation in the float position of the magnetic head employed in the magnetic disk device being in use for each predetermined time interval. Furthermore, the disk subsystem measures the variation in the float height of the magnetic head and the displacement in the track direction based on the envelope signal and the phase shift of the read data. The data stored in the magnetic disk device that is in a non-recovered state even after the predetermined recovering operation, is transferred and copied onto the spare device to thereby effect the maintenance process on the device in which a failure has occurred. As a result, the improper condition of the float position of the magnetic head can be detected at an early stage and the disk subsystem can be recovered or resumed without stopping its operation.

In the magnetic disk device according to the present invention as has been described above, the gain information in the read amplifier, which is recorded when the data to be measured is reproduced, is stored in a storing means in advance and the data is reproduced using the gain information stored in the storing means to thereby obtain the reproduced data varied according to the amount of flotation of the magnetic head and its position or attitude alone. A variation in voltage amplitude of the reproduced data is detected by a voltage amplitude detecting means and a variation in difference in phase between a reading cycle or period to read the reproduced data and a reference cycle or period is detected by a phase difference detecting means. A calculating means calculates a float interval of the magnetic head and a variation in position of the magnetic head using the above variations. When the float interval of the magnetic head and the variation in position thereof exceed the allowable range, a warning or the like is issued to a user. As a result, breakage of the magnetic head and disk can be prevented in advance.

Further, in the magnetic disk device according to the present invention, the voltage amplitude detecting means can detect a decrease and an increase in the—amount of flotation of the magnetic head based on an increase and a decrease in an envelope signal related to a read signal. The phase difference detecting means uses a reading cycle employed upon reproducing the measuring data, as the reference cycle. Further, the phase difference detecting means can compare the reference cycle and the reproduced-data reading cycle so as to detect a variation in the float position of the magnetic head.

In the disk subsystem according to the present invention, the magnetic disk controller transfers the data stored in the magnetic disk device in which the float interval of the magnetic head and/or the variation in the float position, which exceeds the allowable amount or level, have been detected by the calculating means to the spare magnetic disk device, so as to continuously perform processes. As a result, the data recorded in the magnetic disk device in which the floating state of the magnetic head has varied, can be stored and prevented from becoming unable to be read.

Having now fully described the invention, it will be apparent to those skilled in the art that many changes and modifications can be made without departing from the spirit or scope of the invention as set forth herein.

What is claimed is:
1. A magnetic disk device comprising:
   a. a magnetic disk storing data and also having measuring data periodically stored thereon;
   b. a magnetic head disposed to read data from said disk;
   c. a read amplifier coupled to said magnetic head and having a gain control input and providing at its output read data amplified based on said gain control input;
   d. a storing device storing gain control information derived from said measuring data and supplying said gain control information to said read amplifier gain control input;
   e. a phase locked loop circuit including a first filter having a first critical frequency;
   f. a phase comparator having as inputs said read data output by said read amplifier and an output of said phase locked loop circuit and providing as an output a signal representing the phase difference between the phase of said inputs;
   g. a second filter that has a higher critical frequency than said first critical frequency, coupled to the output of said phase comparator, outputting a signal corresponding to a phase difference of the read data and the output of the phase locked loop circuit;
   h. a calculator that calculates a variation in the float position of the magnetic head based on the phase difference of the read data and the output of the phase locked loop circuit.

2. A magnetic disk device according to claim 1 and further including an envelope signal generating circuit coupled to the output of said read amplifier providing a signal indicating amplitude variations in said output signal.

3. A magnetic disk device according to claim 1 and further including:
   a. an automatic gain control device coupled to the output of said read amplifier and providing an output, said output coupled to an input of said storing device;
   b. a first switch having said automatic gain control device output as an input and having an output coupled to said gain control input of said read amplifier; and
   c. a second switch having an input coupled to an output of said storing device and an output coupled to said gain control input of said read amplifier.

4. A magnetic disk device according to claim 3 wherein said storing device comprises:
   a. a memory having a data input/output;
   b. an analog to digital converter having an input coupled to the output of said automatic gain control device and an output coupled to said data input/output; and
   c. an digital to analog converter having an input coupled to said data input/output and an output coupled to the input of said second switch.

5. A magnetic disk device according to claim 4 wherein said magnetic disk has track and sector information stored thereon and said memory has an address input and further including an address generating circuit receiving track and sector information from said magnetic disk and providing address information to said address input based on said track and sector information.

6. A magnetic disk device according to claim 5 and further including an envelope signal generating circuit coupled to the output of said read amplifier providing a signal indicating amplitude variations in said output signal.

7. A disk subsystem including:
   a. a plurality of magnetic disk devices, each of said plurality of magnetic disk devices comprising:

i. a magnetic disk storing data and also having measuring data periodically stored thereon;

ii. a magnetic head disposed to read data from said disk;

iii. a read amplifier coupled to said magnetic head and having a gain control input and providing at its output read data amplified based on said gain control input;

iv. a storing device storing gain control information derived from said measuring data and supplying said gain control information to said read amplifier gain control input;

v. a phase locked loop circuit including a first filter having a first critical frequency;

vi. a phase comparator having as inputs said read data output by said read amplifier and an output of said phase locked loop circuit and providing as an output a signal representing the phase difference between the phase of said inputs; and vii. a second filter that has a higher critical frequency than said first critical frequency, coupled to the output of said phase comparator, outputting a signal corresponding to a phase difference of the read data and the output of the phase locked loop circuit; and viii. a calculator that calculates a variation in the float position of the magnetic head based on the phase difference of the read data and the output of the phase locked loop circuit;

i. one of said plurality of disk devices being a spare magnetic disk device;

j. a magnetic disk controller controlling said magnetic disk devices, said magnetic disk controller receiving the phase difference signals output by the second filters in said magnetic disk devices, said magnetic disk controller adapted to:

i. detect one of said phase difference signals exceeding a predetermined value; and ii. upon said detection, transfer the data from the magnetic disk device producing said phase difference signals exceeding a predetermined value to said spare magnetic disk device.

8. A disk subsystem according to claim 7 and further including an envelope signal generating circuit coupled to the output of said read amplifier providing a signal indicating amplitude variations in said output signal.

9. A disk subsystem according to claim 7 and further including:

a. an automatic gain control device coupled to the output of said read amplifier and providing an output, said output coupled to an input of said storing device;

b. a first switch having said automatic gain control device output as an input and having an output coupled to said gain control input of said read amplifier; and c. a second switch having an input coupled to an output of said storing device and an output coupled to said gain control input of said read amplifier.

10. A disk subsystem according to claim 9 wherein said storing device comprises:

a. a memory having a data input/output;

b. an analog to digital converter having an input coupled to the output of said automatic gain control device and an output coupled to said data input/output; and c. an digital to analog converter having an input coupled to said data input/output and an output coupled to the input of said second switch.

11. A disk subsystem according to claim 10 wherein said magnetic disk has track and sector information stored thereon and said memory has an address input and further including an address generating circuit receiving track and sector information from said magnetic disk and providing address information to said address input based on said track and sector information.

12. A method of detecting the float position of a magnetic head reading stored data from a magnetic disk in a magnetic disk device, in which data read is coupled to a read amplifier having a gain control input, comprising:

a. initially reading the measuring data that is disposed in advance on the magnetic disk periodically, and coupling back to said gain control input, gain control information based on amplitude variations in the measuring data read;

b. initially storing said gain control information derived from said measuring data;

c. reading data from said disk while controlling gain with said stored gain control information;

d. generating from the data read a first signal having a first critical frequency;

e. comparing said signal with a second signal obtained from the data read from said disk to obtain a n output signal representing the phase difference between the said first signal and said second signal; and f. detecting a variation in the float position of the magnetic head based on said phase difference.

13. A method according to claim 12, wherein initial steps a. and b. are accomplished on required occasions.

14. A method according to claim 12 and further including:

a. generating an envelope signal indicating amplitude variations when reading data;

b. comparing said envelope signal with a predetermined value; and c. detecting a variation in the float position of the magnetic head based on said comparison.

15. A method according to claim 12 wherein a plurality of magnetic disk devices is provided, one of said plurality of disk devices being a spare magnetic disk device and further including:

a. controlling said magnetic disk devices, in response to their respective phase differences by:

i. detecting one of said phase difference signals exceeding a predetermined value; and ii. upon said detection, transferring the data from the magnetic disk device producing said phase difference exceeding a predetermined value to said spare magnetic disk device.

16. A method of detecting the float position of a magnetic head reading stored data from a magnetic disk in a magnetic disk device, in which data read is amplified with gain control, comprising:

a. storing gain control information derived from a measuring data on the magnetic disk;

b. reading data from said disk while controlling gain with said stored gain control information;

c. generating from the data read a first signal having a first critical frequency;

d. comparing said signal with a second signal obtained from the data read from said disk to obtain an output signal representing the phase difference between the said first signal and said second signal;

e. detecting a variation in the float position of the magnetic head based on said phase difference; and f. comparing a predetermined value with the result of said detection and determining, based on the result of comparison, whether the magnetic head is in a reproducible state.

17. A method according to claim 16 wherein a plurality of magnetic disk devices is provided, one of said plurality of disk devices being a spare magnetic disk device and further including:
   a. upon determining, based on the result of comparison, that a magnetic head is not in a reproducible state transferring the data from the magnetic disk device whose magnetic head is not in a reproducible state to said spare magnetic disk device.

18. A method according to claim 17 and further including:
   a. generating an envelope signal indicating amplitude variations when reading data;
   b. comparing said envelope signal with a predetermined value; and
   c. also using said comparison to determine if a magnetic head is in a reproducible state.

* * * * *